United States Patent [19]
Meyers et al.

[11] Patent Number: 5,883,690
[45] Date of Patent: Mar. 16, 1999

[54] JOYSTICK ADAPTER FOR A DIRECTIONAL KEYPAD ON A GAME CONTROLLER

[75] Inventors: Paul Meyers; Bryan Bowman; Todd Midkiff, all of Indianapolis, Ind.

[73] Assignee: Z-Products, Indianapolis, Ind.

[21] Appl. No.: 866,352

[22] Filed: May 30, 1997

[51] Int. Cl.[6] ............................... G09G 5/08; G09G 5/00
[52] U.S. Cl. ..................... 345/161; 345/157; 345/160; 345/168
[58] Field of Search .................................. 345/156, 157, 345/160, 161, 168; 463/37, 38, 46, 47

[56] References Cited

U.S. PATENT DOCUMENTS

| | | | |
|---|---|---|---|
| 4,575,591 | 3/1986 | Lugaresi | 200/6 |
| 4,786,768 | 11/1988 | Langewis et al. | 200/6 |
| 4,825,019 | 4/1989 | Fisher | 200/6 |
| 4,945,357 | 7/1990 | Tal | 341/20 |
| 5,034,574 | 7/1991 | Martovitz | 200/6 |
| 5,065,146 | 11/1991 | Garrett | 345/161 |
| 5,140,313 | 8/1992 | Wen | 345/161 |
| 5,343,219 | 8/1994 | DuBosque, Jr. | 345/160 |
| 5,476,261 | 12/1995 | Hulstrand | 273/148 |
| 5,532,476 | 7/1996 | Mikan | 345/161 |
| 5,541,622 | 7/1996 | Engle et al. | 345/161 |
| 5,615,083 | 3/1997 | Burnett | 345/161 |
| 5,805,141 | 9/1998 | Hsu | 345/161 |

*Primary Examiner*—Vijay Shankar
*Attorney, Agent, or Firm*—Beck, Michael & Beck, P.C.

[57] ABSTRACT

A joystick adapter is provided for mounting over the depressible buttons of a directional keypad on a video game controller. The adapter includes a joystick having a knob and a separable base. The knob is configured for manual manipulation, while the underside of the base is configured to contact and be supported by the depressible buttons of the keypad. The knob and base are pressfit together so that the individual components can be removed and replaced. The adapter further includes a clip having a shell that is supportable on the controller body. The shell defines an opening to receive the joystick therethrough with the knob above the shell and the base between the shell and the keypad. The adapter further includes an elastic T-shaped band that surrounds the bottom and sidewalls of the controller body. The band includes three arms with resilient openings in each of the arms. The openings are adapted to engage a corresponding tab projecting from the shell of the joystick adapter clip. In use, the resilient knob and base of the joystick are assembled through the clip opening. The clip is then placed on the upper surface of the controller body so that the shell of the clip surrounds the keypad and further so that the joystick base is supported by the depressible buttons of the keypad. The three arms of the elastic retaining band are engaged to respective tabs on the clip so that the clip is held in position on the controller body.

20 Claims, 8 Drawing Sheets

JOYSTICK ADAPTER FOR A DIRECTIONAL KEYPAD ON A GAME CONTROLLER

BACKGROUND OF THE INVENTION

The present invention pertains to an adapter for converting manually depressible keys to joystick control. In a specific embodiment, the invention contemplates a joystick adapter for use with a video game controller for mounting over the directional keypad.

Since the advent of the home video game explosion in the late 1970's, the game controller has become a fixture in a majority of the American homes. In its typical form, the video game controller constitutes a hand-held base with a keypad for directional control buttons and a keypad for buttons that perform a variety of functions, such as fire, run, jump, etc. As one might expect, the great commercial success of home video games has spawned a growing secondary market for modified game controllers. Much of the design work in this field has been focused upon making the controllers more ergonomic and more easily used by the video game enthusiast of any age.

For example, manufacturers of game controllers have modified the arrangement and orientation of the directional control buttons of the keypad, as well as the operational buttons. Others have modified the structure of the controller to include pistol grips or other types of gripping surfaces. In these instances, the structure of the controller promotes operation of the various keypad buttons by the user's left and right thumbs. Still other game controller manufacturers have substituted the hand held game controller for a supported unit that includes a separate joystick in lieu of the directional keypad.

While the fixed based controllers incorporating joysticks have managed to capture the benefits of using a joystick, these devices suffer from the need to be supported on a table or flat surface, or on the user's lap. In this sense, these types of game controllers are not hand held. At the same time, the fixed base joystick controller generally must be manipulated by grabbing the joystick, which is generally not ergonomic or comfortable to the user.

One approach that has been suggested for modifying hand held game controllers is shown in the patent of Hultstrand, U.S. Pat. No. 5,476,261. This patent discloses an adapter for a keypad that includes a disc mounted on top of each of the directional keys. While this device approximates the function of a joystick, it does not have the same lever arm as a typical joystick. Moreover, the device shown in the '261 Patent must be held in position by the user since it is not separately connected to the game control pad.

Other similar approaches have been taken in the design of adapters for cursor control keys on a typical computer keyboard. For example, the patents of Tal, U.S. Pat. No. 4,945,357; Fisher, U.S. Pat. No. 4,825,019; Martovitz, U.S. Pat. No. 5,034,574 show joystick adapters that are freely supported on the keyboard surface and that toggle to depress the respective cursor keys. In each of these three designs, the joystick adapter is specifically configured for use on a computer keyboard, utilizing one of the keys as a fulcrum point for the operation of the remaining keys.

In another genre of patents, a joystick adapter is separately mounted to a computer keyboard, as represented by the patents of Lugaresi, U.S. Pat. No. 4,575,591; Langewis et al., U.S. Pat. No. 4,786,768 and DuBosque, Jr., U.S. Pat. No. 5,343,219. Again, these patents focus on joystick control for cursor keys on a computer keypad. Moreover, each of these patents show a very complicated structure for supporting the joystick on the keyboard body, a structure that is not feasible for use with a hand held video game controller.

There remains a need in the video game industry for an adapter for use with a hand-held game controller, and particularly an adapter for converting manual buttons of a manual keypad to joystick control. This same need can apply to computer keyboards where a simple and ergonomically feasible joystick adapter can be beneficial.

SUMMARY OF THE INVENTION

The deficiencies of the prior game controllers and joysticks are addressed by the present invention which contemplates a joystick adapter for mounting over a keypad having a number of depressible buttons. In one embodiment of the invention, the joystick adapter includes a joystick having a knob configured for manual manipulation and a detachable base. The underside of the base is configured to contact and be supported by the depressible buttons of the keypad.

The adapter further includes a clip defined by a shell supportable on the controller body. The shell itself defines an opening to receive the joystick therethrough with the knob above the shell and the base situated between the shell and the keypad. Means are provided for retaining the clip on the controller body.

In accordance with one aspect of the invention, the means for retaining the clip on the controller body includes an elastic band having a T-shape. The shell of the clip includes three arms projecting from the shell, each arm carrying a tab. The band includes a resilient opening in each of the arms of the band, each opening being configured to be resiliently attached around the tabs on the joystick adapter clip. In use, the clip of the adapter is supported on the upper surface of the controller body, while the elastic band stretches around the bottom and sides of the body to engage the tabs on the shell.

In another aspect of the invention, the joystick itself includes a knob and a base that are preferably detachable. In one aspect, the knob includes a press-fit shaft that is configured to be engaged within a similarly arranged press-fit recess in the base. A kit can be provided with the invention in which a variety of knobs are provided, each having a different configuration. For example, in one embodiment the knob has a generally spherical shape. In another, the knob is a flat disc with a number of concentric rings serving as a friction surface. In a third embodiment, the knob approaches a tear-drop shape, while an additional knob includes a saucer-shaped surface having a recess for the user's thumb. In another embodiment, the shell of the joystick adapter clip includes a slot communicating with the opening. In this embodiment, a preassembled joystick, or a unitary single-piece joystick can be inserted through the slot in the shell to reside within the clip opening.

It is one object of the present invention to provide a joystick adapter that can be engaged over depressible buttons of a keypad. A further object resides in features of the invention that allow the adapter to be removably retained on the controller body so that the adapter stays attached to the body regardless of the orientation of the controller.

A further object of the invention resides in the interchangeability of the joystick knobs. This feature of the invention achieves an additional object of providing different controller knobs depending upon the user's preference.

Other objects and specific benefits of the present invention can be discerned from the following description and accompanying figures.

DESCRIPTION OF THE FIGURES

FIG. 11 A is a bottom perspective view of a further embodiment of a knob for use with the joystick adapter of the present invention.

DESCRIPTION OF THE PREFERRED EMBODIMENTS

For the purpose of promoting an understanding of the principles of the invention, reference will now be made to preferred embodiments thereof and specific language will be used to describe the same. It will nevertheless be understood that no limitation of the scope of the invention is thereby intended, such alterations and further modifications in the invention, and such further applications of the principles of the invention as described therein being contemplated as would normally occur to one skilled in the art to which the invention relates.

In one aspect of its preferred embodiment, the present invention contemplates a joystick adapter configured to be mounted on a hand-held game controller. In the preferred embodiment, a joystick knob is supported on the depressible buttons of a directional keypad and is supported for multi-directional pivoting. The invention also contemplates means for removably attaching and supporting the adapter on the game controller so that the joystick adapter retains its position regardless of the orientation of the controller. While the most preferred embodiment disclosed herein concerns the use of the inventive joystick adapter with a video game controller, it is understood that the same features can be implemented for other types of keypads. For instance, certain aspects of the structure of the present invention could be modified to support a joystick on the cursor keys of a computer keyboard.

Figure 1:
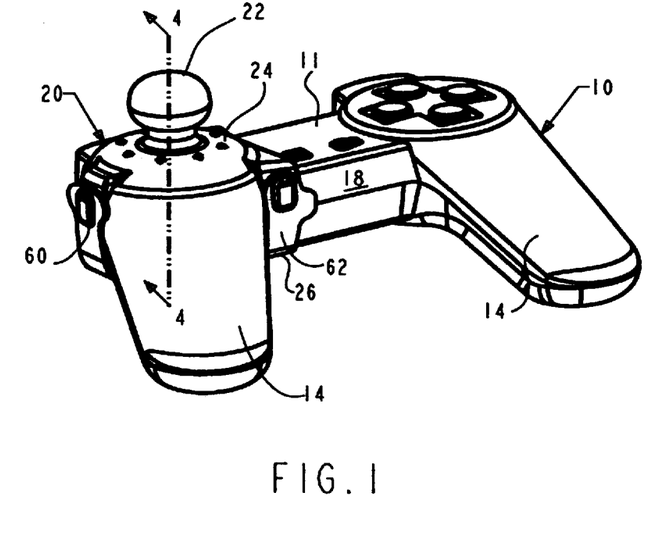
FIG. 1 is a top perspective view of a game controller with a joystick adapter according to one embodiment of the present invention.
Figure 2:
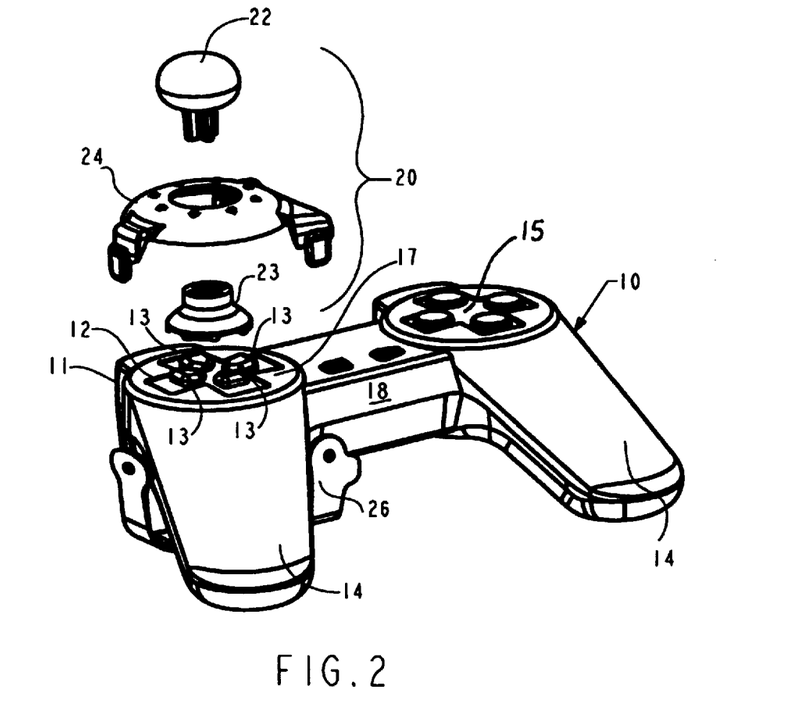
FIG. 2 is an exploded perspective view of the game controller and joystick adapter shown in FIG. 1, with the components of the joystick adapter exploded for clarity.

Referring now to FIGS. 1 and 2, a preferred embodiment of the present invention is depicted. The invention contemplates a joystick adapter 20 that is mounted to a game controller 10. The game controller 10 has a body 11 with a directional keypad 12 at one end of the body and a control keypad 15 at another end of the body. The directional keypad 12 includes depressible buttons 13 that are normally configured to be depressed by the user's fingers. In one particular type of game controller, the body 11 further includes hand grips 14 projecting outwardly therefrom in an ergonomic fashion. In this design, the hand grips are intended to be grasped by the user with the directional keypad 12 and control keypad 15 being manipulated by the user's thumbs.

In accordance with the invention, the joystick adapter 20 is removably mounted to the body 11 of the game controller 10, and more specifically mounted over the directional keypad 12. The joystick adapter 20 includes a controller stick 22 that is manipulated by the user's thumb, and a controller base 23 which is engaged to the controller stick 22. A clip 24 houses the controller base 23 and is configured for attachment to the game controller body 11. An attachment band 26 is provided for that purpose.

Figure 3:
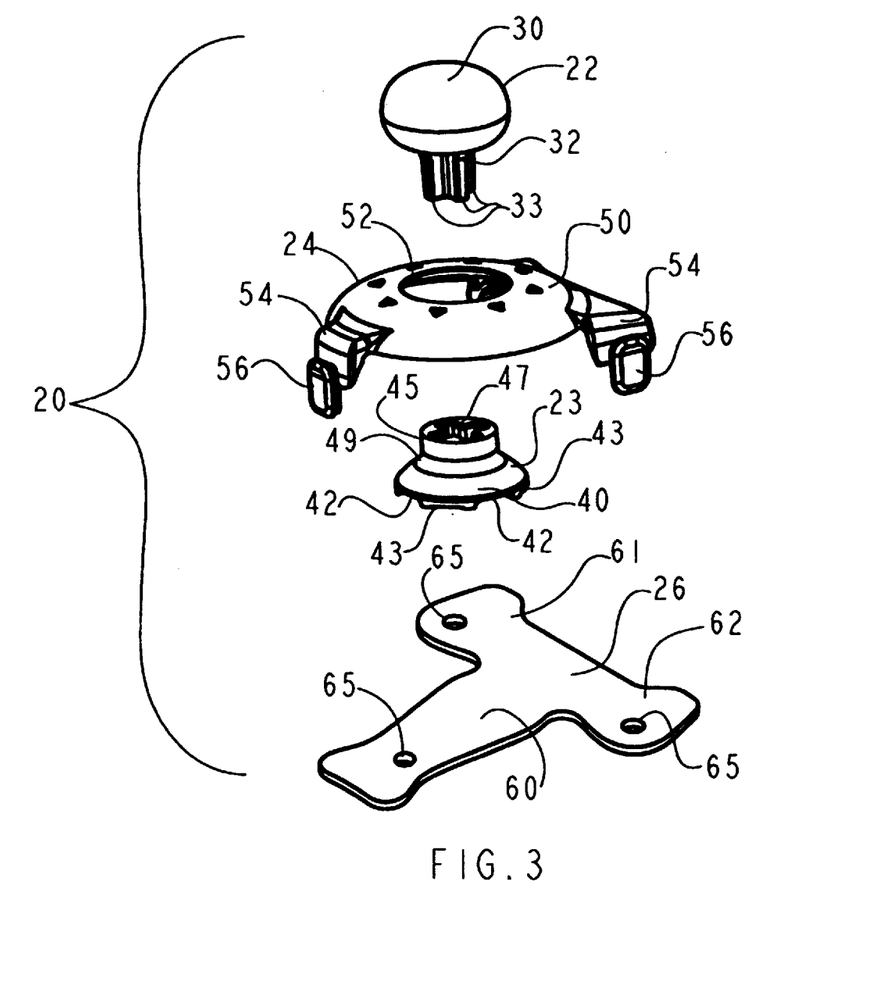
FIG. 3 is an exploded perspective view of the joystick adapter shown in FIG. 2, without the game controller.
Figure 7:
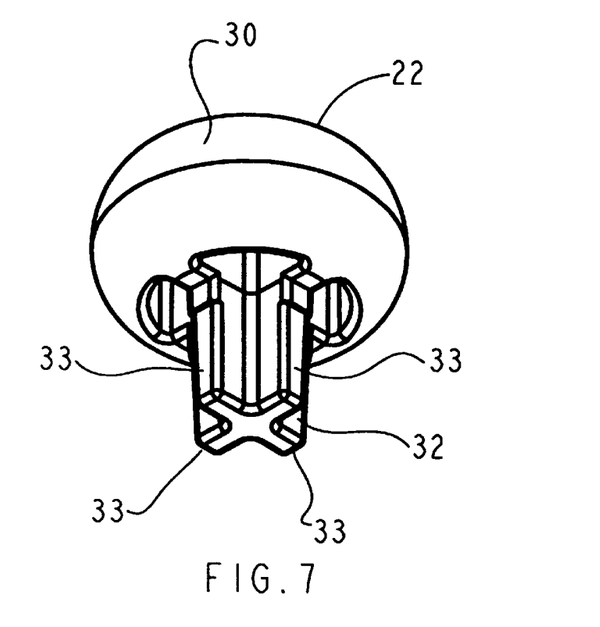
FIG. 7 is a bottom perspective view of a knob forming part of the joystick adapter in the embodiment shown in FIG. 2.

Greater detail of the joystick adapter 20 can be found in the exploded view of FIG. 3. In particular, the controller stick 22 is shown as including a knob 30 and a press-fit shaft 32 projecting therefrom. The knob 30 in the specific embodiment is generally spherical in shape so that it presents an omni-directional gripping surface for the user. As shown in more detail in the enlarged view of FIG. 7, the press-fit shaft 32 includes a number of wings 33 radiating outward along the length of the shaft 32. In the specific embodiment, the wings 33 form a cross shape.

Figure 8:
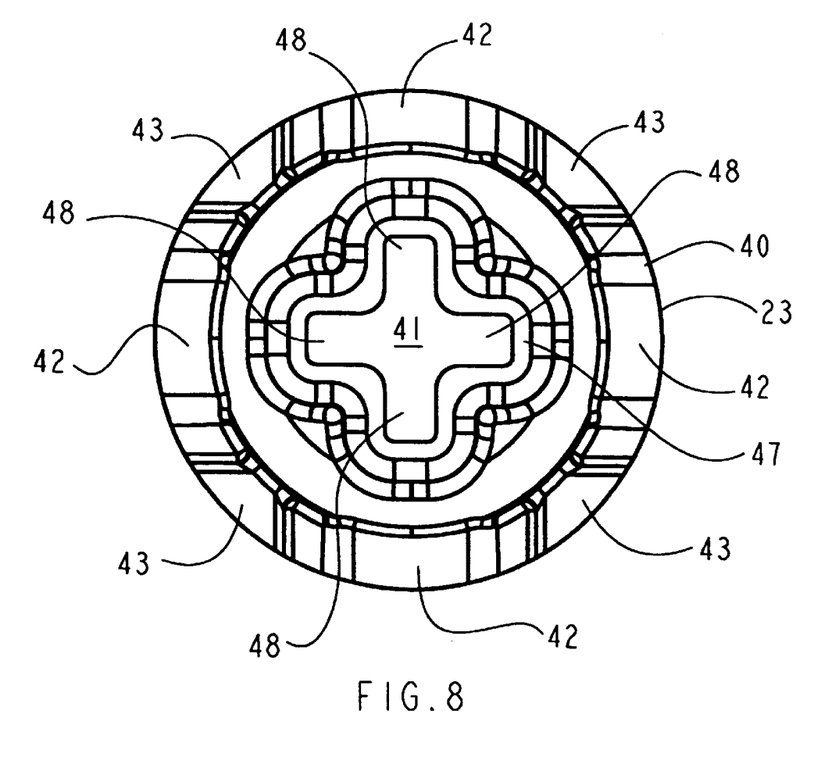
FIG. 8 is a bottom elevational view of the lower portion of the joystick used with the adapter shown in FIG. 2.
Figure 9A:
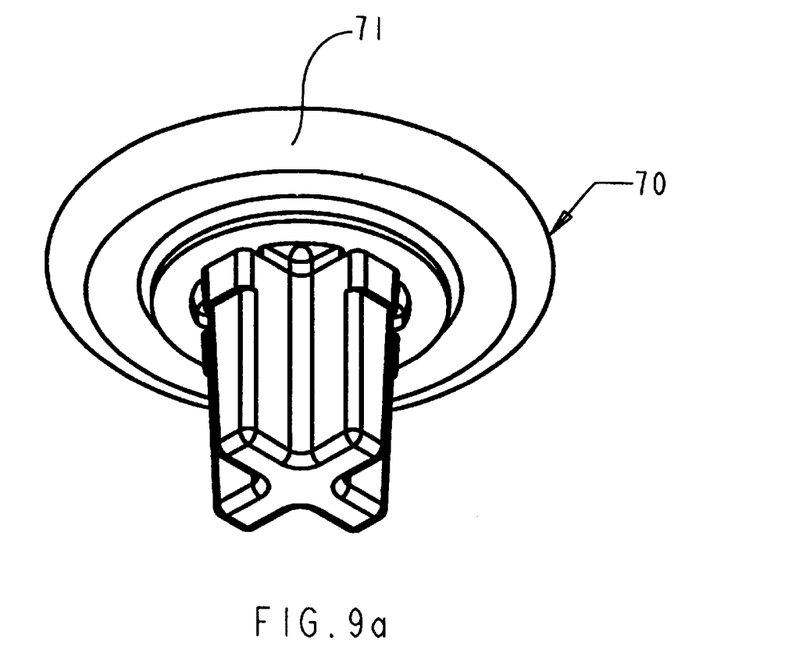
FIG. 9 is a bottom perspective view of a further embodiment of a knob for use with the joystick adapter of the present invention.
Figure 9B:
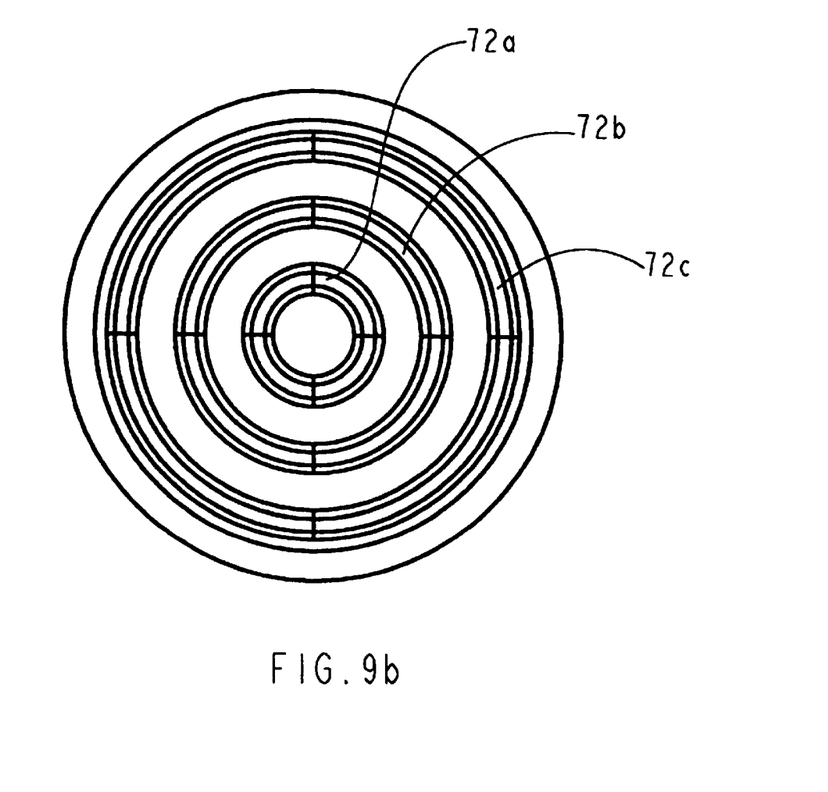

The controller stick 22 is configured for press-fit engagement with the controller base 23. Details of the controller base are shown in FIGS. 3 and 8. In the specific embodiment, the base 23 includes a contact body 40 which is configured to contact the clip 24 when the joystick adapter 20 is assembled. The underside 41 of the contact body is preferably configured to mate with the depressible buttons 13 on the directional keypad 12. In the specific embodiment, the underside 41 defines button recesses 42 that are uniformly spaced around the contact body 40 in conformity with the location of the keypad buttons 13. The underside 41 further defines bosses 43 between the button recesses 42. The bosses are configured to resist rotation of the controller base 23 relative to the keypad buttons 13.

In the preferred specific embodiment, the underside 41 of the contact body 40 of the controller base 23 is configured to resist rotation or spinning of the controller base 23 relative to the keypad buttons 13. Alternatively, however, the underside 41 can have other configurations that may or may not resist this relative rotation. For example, the underside 41 can be substantially flat, or it can be slightly concave into the middle of the contact body 40 so that the controller base 23 can be aligned or oriented concentrically within the directional keypad 12. Regardless of the configuration of the underside 41, in accordance with this aspect of the invention, the contact body 40 is substantially supported by each of the depressible buttons 13 on the directional keypad 12. In this manner, the controller base 23 acts directly upon the keypad 12 without any delay that may be created by the base 23 being suspended above the keypad buttons 13.

Further in accordance with the present embodiment, the controller base 23 includes an attachment hub 45 projecting upward from the contact body 40. The attachment hub 45 defines a press-fit recess 47 that is configured for press-fit engagement with the shaft 32 of the controller stick 22. In the specific embodiment, the recess 47 defines a cross-shaped arrangement of panels 48 that conform to the wings 33 of the shaft 32 of the controller stick 22. In accordance with one aspect of the present invention, the shaft 32 of the controller stick 22 and the recess 47 of the controller base 23 are configured for press-fit engagement. In the specific embodiment, the press-fit elements of these two components form a cross-shape to avoid relative rotation between two components. It is understood, however, that various configurations between the press-fit shaft 32 and the recess 47 are contemplated. For example, a solid shaft and projecting key arrangement could be used, a Y-shaped arrangement, or even a smooth cylinder could be implemented provided that press-fit tolerances are maintained between the two components. It is further preferable that the press-fit engagement be removable, such as for replacement of the joystick knob 30.

Figure 4:
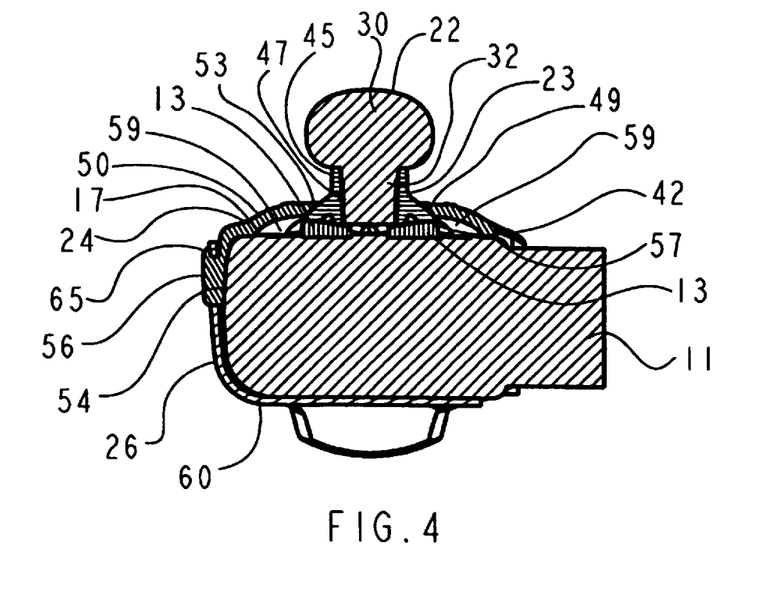
FIG. 4 is an end cross-sectional view of the joystick adapter according to the present invention mounted on the game controller, as depicted in FIG. 1, taken along line 4—4 and viewed in the direction of the arrows.

The controller base 23 further includes a bearing surface 49 defined between the contact body 40 and the attachment hub 45. As shown more clearly in the cross-sectional view of FIG. 4, the bearing surface 49 of the controller base 23 is pivotably supported within the clip 24. In more detail, the clip 24 includes shell 50 that defines a hub opening 52. The attachment hub 45 projects through the hub openings 52, as shown in FIG. 4. The underside of the shell 50 defines a bearing surface 53 that substantially conforms with the bearing surface 49 of the controller base 23. In one specific embodiment, the two bearing surfaces are substantially conical in shape, although other configurations are contemplated that permit pivoting of the controller stick 22 in all directions relative to the clip shell 50.

Figure 5:
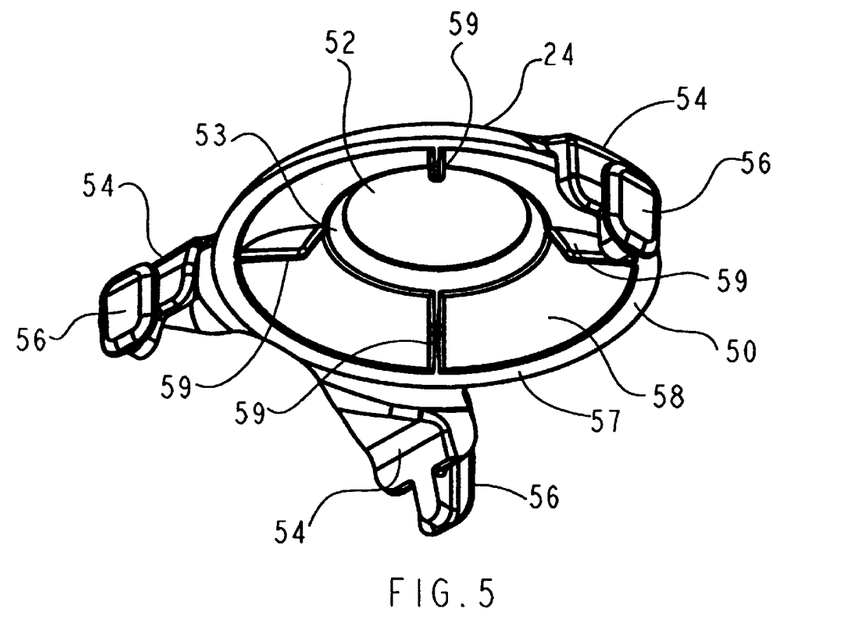
FIG. 5 is a bottom perspective view of the clip in one embodiment of the joystick adapter shown in FIG. 2.
Figure 6:
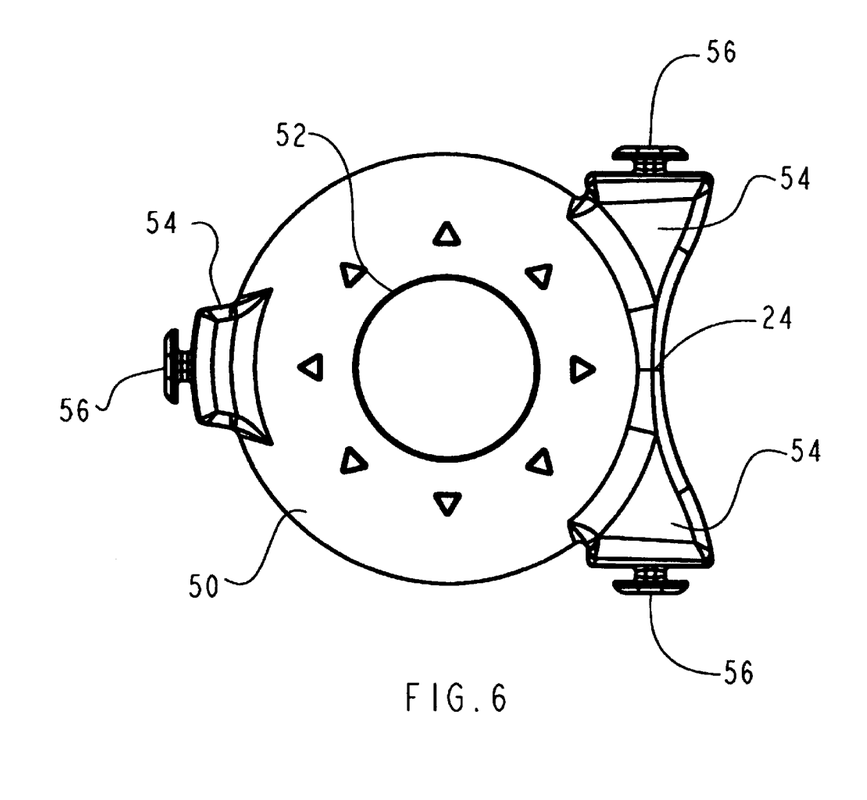
FIG. 6 is a top elevational view of the clip shown in FIG. 5.

As shown in the detailed views of FIGS. 4–6, the clip 24 includes a number of arms 54 projecting from the shell 50. Each of the arms terminates in a tab 56, which in the specific embodiment are generally rectangular in shape. The tabs 56 are arranged for engagement by the attachment band 26.

The shell 50 defines a concave surface 58 that is arranged to face the directional keypad 12. The clip 24 is supported on the body 11 of the game controller 10 and by way of the rim 57 extending around the base of the shell 50 and by a number of support walls 59 projecting from the concave surface 58 of the shell 50. In the specific embodiment, the support walls 59 are disposed radially outward from the depressible buttons 13 of the keypad 12 and are preferably interdigitated between the buttons 13.

The components of the controller base 23 and clip 24 are sized so that the keypad buttons 13 are disposed within the button recesses 42 of the controller base 23, and so that the controller base 23 is substantially supported by the buttons 13. The concave surface 58 of the shell 50, as well as the bearing surface 53, are situated a sufficient distance above the keypad so that the buttons 13 are not depressed simply by engagement of the adapter 20 to the controller body 11.

As shown in FIGS. 1 and 4, the controller stick 22 can be press-fit into the attachment hub 45 of the controller base 23 once the attachment hub 45 is extended through the hub opening 52 of the clip shell 50. In this manner, the controller stick 22 and base 23 are retained with the clip 24 regardless of whether the joystick adapter 20 is mounted on the game controller body 11.

As depicted in FIGS. 2–4, the clip 24 is held to the controller body 11 by way of the attachment band 26. In one specific embodiment, the attachment band 26 includes a number of attachment fingers 60, 61 and 62 that are integrally formed together. Each of the fingers 60 includes a resilient opening 65 that is configured to be expanded for placement over a corresponding tab 56 on the clip 24. In one specific embodiment, the attachment band 26 is formed of a resilient elastic material, such as commercial grade rubber. The attachment band 26 can also be formed of other resilient elastic material, provided that it has a requisite amount of elasticity. In other words, the attachment band 26 cannot be so elastic that it is unable to generate sufficient pulling force to pull the clip 24 down onto the game controller body 11. On the other hand, the band 26 must have enough elasticity to be easily stretched around the body 11 for attachment to each of the tabs 56 on the clip 24. Finally, the material of the band 26 must be sufficiently elastic so that the user can easily stretch the openings 65 to mount them over the respective tabs 56.

In using the joystick adapter 20 of the present embodiment, the user would engage the controller stick 22 to the controller base 23 with the attachment hub 45 projecting through the hub opening 52 of the clip shell 50. The user then would engage an attachment finger 60 and 61 to two of the three tabs 56 projecting from the shell 50. The unit could then be placed over the game controller body 11, and specifically over the directional keypad 12. At that point, the remaining attachment finger 62 could be stretched underneath the controller body 11 for engagement with the final tab 56. In accordance with the present specific embodiment, three such arms 54 and tabs 56 are provided on the clip 24, together with corresponding fingers 60–61 on the attachment band 26. In certain instances, three such connection points between the attachment band 26 and the clip 24 may be necessary to support the joystick adapter solidly on the controller body 11. Depending upon the configuration of the controller body 11, additional attachment points between the clip 24 and the band 26 may be necessary, so that additional arms 54 would be added to the clip 24 and additional fingers 60–62 would be added to the attachment band 26. One object of the invention is achieved, however, by minimizing the number of attachments necessary between the band 26 and the clip 24. It is further understood that the provision of the attachment band 26 allows the user to remove the joystick adapter 20 at any time.

In accordance with the preferred embodiment, the joystick adapter 20 includes an attachment band that is a unitary element, meaning that it is formed from a single sheet of material. However, the invention further contemplates a hybrid attachment band 26 in which separate elastic members are attached to a plate that contacts the bottom of the controller body 11. In this instance, the separate elastic members can project from the plate for engagement to the respective tabs 56 of the clip 24. In a further alternative, fingers of the attachment band 26 can be permanently attached to a respective arm 54 of the clip 24. For example, depending upon the configuration of the controller, two of the three fingers 60–62 of the attachment band 26 could be permanently attached to the clip 24. In one specific arrangement, fingers 60 and 61, or 60 and 62 could be permanently attached to a respective tab 56 and arm 54. In this instance, then, the user would only need to stretch one of the fingers for engagement over the final tab 56 on the clip 24.

The present invention provides unique features that permit the use of a variety of knobs, such as knob 30, with the joystick adapter 20. In the first illustrated embodiment, the knob 30 is substantially spherical in shape. Alternative embodiments of controller sticks are shown in FIGS. 9–11B. For example, a controller stick 70 shown in FIG. 9 includes a knob 71 that is generally in the form of a flattened disc. In one specific embodiment, the knob 71 can include a pattern of concentric raised rings, such as a rings 72A–C. The rings provide for a greater frictional contact between the user's thumb and the surface of the knob 71.

Figure 10:
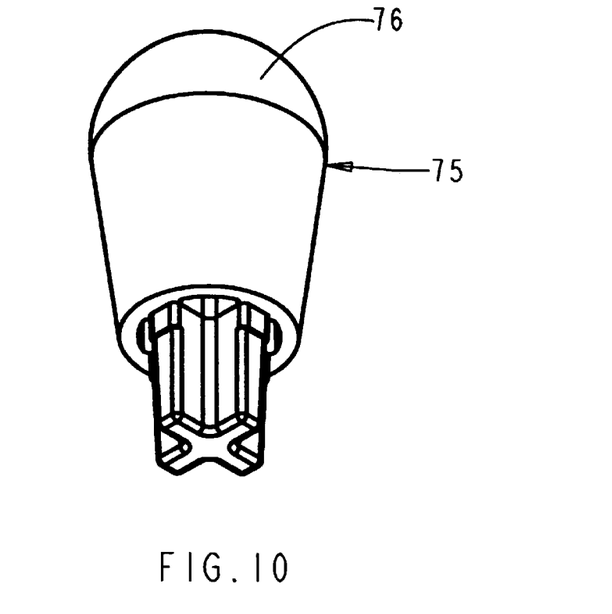
FIG. 10 is a bottom perspective view of a further embodiment of a knob for use with the joystick adapter of the present invention.

Another controller stick 75 is shown in FIG. 10 in which the knob 76 is generally oblong and almost teardrop in shape. The knob 76 shown in FIG. 10 more closely approximates a typical joystick configuration.

Figure 11A:
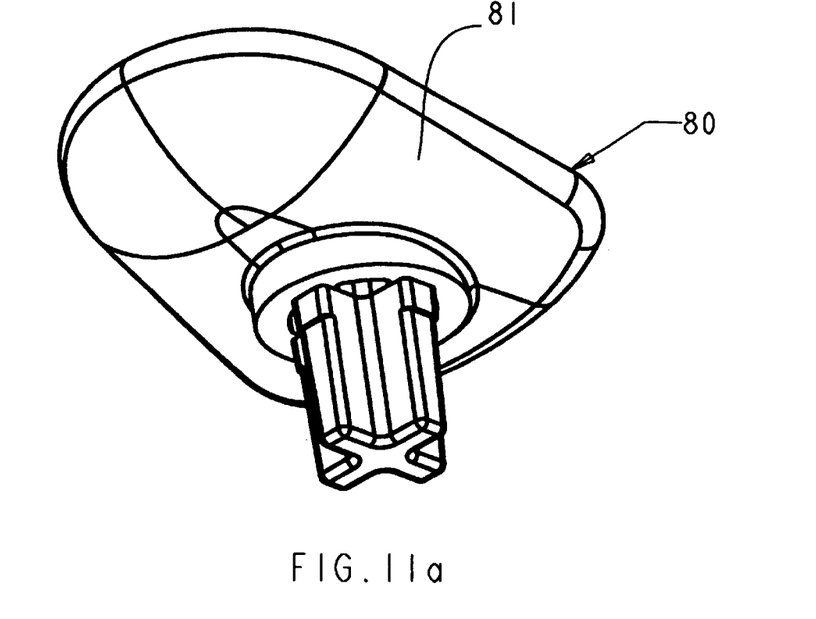
Figure 11B:
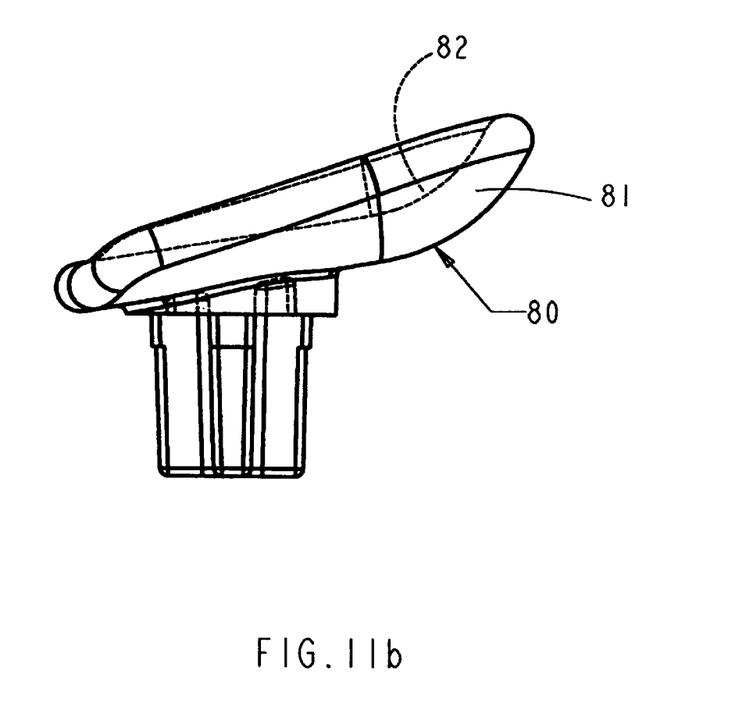
FIG. 11B is a side-elevational view of the knob shown in FIG. 11A.

A controller stick 80 is shown in FIGS. 11A—11B. In this embodiment, the knob 81 is in the form of a contoured disc. In particular, the upper surface of the knob 81 defines a recess 82 that is configured to seat the user's thumb. The ergonomic effectiveness of the thumb recess 82 can be enhanced by permitting particular orientations of the knob 81 with respect to the game controller body 11. In other words, the recess 82 can be aligned by permitting relative rotation between the contact body 40 of the controller base 23 and the keypad buttons 13. Alternatively, the angular orientation of the thumb recess 82 can be adjusted by modifying the press-fit engagement between the controller stick 22 and the base 23. In this regard, the press-fit configuration between the two components can be in the form of circumferential serrations, rather than in the cross-shape of the preferred embodiment depicted in the prior Figures.

Figure 12:
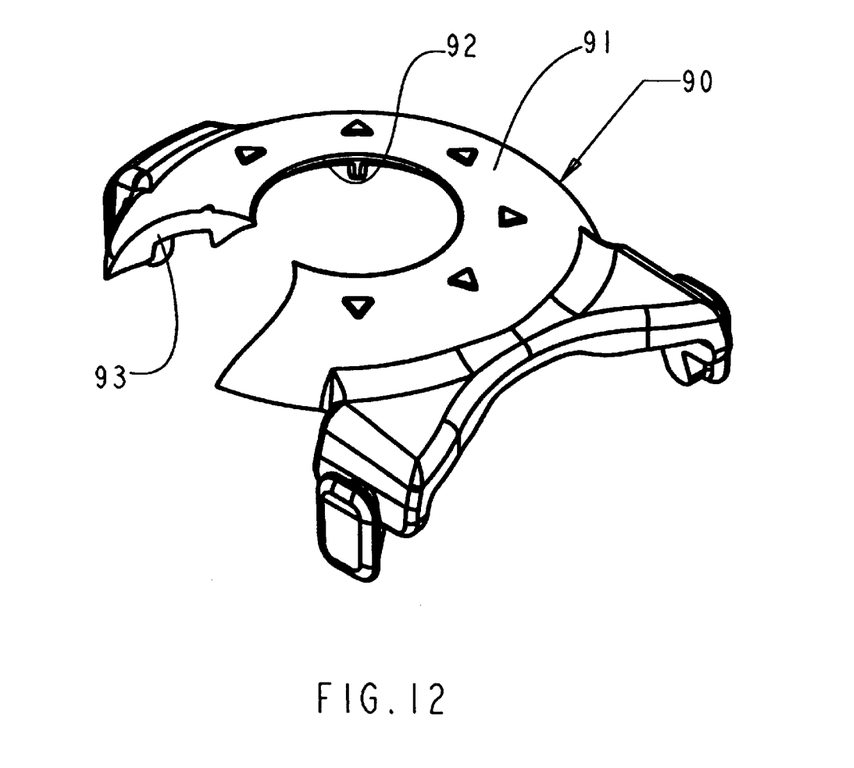
FIG. 12 is a top perspective view of a further embodiment of the clip used with the joystick adapter according to the present invention.

In an aspect of a further embodiment of the invention, a clip 90, as depicted in FIG. 12, permits reception of a controller stick 22 and base 23 that is either integral or already press-fit together. In particular the clip 90 includes a shell 91 that is substantially similar to the configuration in the clip shell 50 shown in FIGS. 3–6. The clip 90 deviates from the prior embodiments in that a hub slot 93 is defined through the shell 91 to the hub opening 92. With this embodiment, the attachment hub 45 of the controller base 23 can be pushed through the hub slot 93 into the hub opening. Preferably, the hub slot 93 has a width that is slightly less than the diameter of the bearing surface 49 of the controller base 23. Most preferably, the hub slot 93 has a width that is less than the diameter of the attachment hub 45 so that the shell 91 must resiliently spread slightly to permit passage of the controller base attachment hub 45 into the hub opening 92, in a sort of snap-fit arrangement. With this embodiment, each of the several controller sticks, 22, 70, 75 and 80 can be integrally formed with a base, such as base 23 and made available for ready interchangeability.

The present invention contemplates a joystick adapter 20 that is very simple in construction and that is easily engaged to a game controller 10 by a user of any age. The adapter 20 in the preferred embodiment is formed of a plastic, such as polyethylene. Each of the components, such as the controller stick 22, base 23 and clip 24, can be readily formed by injection molding. The material for the controller base 23 and clip 24 must be sufficiently resilient and wear-resistant, since pivoting of the controller stick 22 will generate some force between the bearing surface 49 of the base 23 and the bearing surface 53 of the clip shell 50. Preferably, the clip 24 and particularly the shell 50, are formed of a sufficiently resilient plastic so that the clip does not deflect or deform when engaged by the attachment band 26. In the specific embodiment, the provision of the support walls 59 enhance the stiffness of the shell 50 and provide a reaction surface against the elastic forces applied by the attachment band 26 to the tabs 56 and arms 54 of the clip 24.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

For example, the game controller 10 of the specific illustrated embodiment includes hand grips 14 and a specific arrangement of the directional keypad 12. On the other hand, the joystick adapter 20 of the present invention can be modified so that its components will readily fit other types of controllers. For example, the clip 24, and its arms 54, can be modified or arranged to fit a controller having a rectangular end at which the keypad is supported. Similar modifications to the attachment band 26 can be made to firmly engage the clip to the controller body.

Further modifications can be made to the engagement between the joystick knob, such as knob 30, and base 22. While a press-fit engagement is contemplated in some embodiments, other forms of solid fixation can be implemented, such as a twist lock or bayonet mount, a threaded engagement or a fixation utilizing resilient depressible arms locked within receiving notches. Other engagements are contemplated that provide solid attachment of the two components without relative movement or rotation.

What is claimed is:

1. A joystick adapter for mounting over a keypad having depressible buttons disposed on an upper surface of a controller body, the adapter comprising:

a joystick including a knob configured for manual manipulation and a base having an underside configured to contact the depressible buttons of the keypad, said joystick being supported by the depressible buttons;

a clip including a shell supportable on the controller body and at least two tabs attached to said shell, said clip defining an opening to receive said joystick therethrough with said knob above said shell and said base between said shell and the keypad; and means for retaining said clip on the controller body including a band having at least two attachment fingers configured for engagement to a corresponding one of said at least two tabs, said band configured to fit around a portion of the controller body to retain said clip thereon.

2. The joystick adapter of claim 1, wherein said band is formed of an elastic material and includes a resilient opening in each of said at least two attachment arms for resiliently receiving a corresponding one of said at least two tabs therethrough.

3. The joystick adapter of claim 1, wherein:

said clip includes three tabs spaced around said shell; and said band includes three attachment fingers arranged to correspond to said three tabs, wherein said tabs and fingers are arranged to wrap around the controller body on three different sides.

4. The joystick adapter of claim 3, wherein said attachment fingers of said band form a T-shape.

5. The joystick adapter of claim 1, wherein said shell is sized to cover the entire keypad on the controller body.

6. The joystick adapter of claim 1, wherein said shell includes a concave surface facing the keypad of the controller body and a rim for contacting the upper surface of the controller body to support said clip thereon.

7. The joystick adapter of claim 6, wherein said shell further includes at least one support wall projecting from said concave surface and arranged to contact the upper surface of the controller body when said clip is retained thereon.

8. The joystick adapter of claim 1, wherein said knob and said base of said joystick are separable.

9. The joystick adapter of claim 8, wherein said joystick includes press-fit means between said knob and said base for press-fit engagement therebetween.

10. The joystick adapter of claim 9, wherein said press-fit means includes a shaft and a recess defined in a respective one of said knob and said base.

11. The joystick adapter of claim 10, wherein said shaft and said recess each have a non-circular shape to prevent relative rotation therebetween.

12. The joystick adapter of claim 1, wherein said base of said joystick includes:
   a contact body defining said underside, said contact body sized to prevent passage through said opening of said shell; and
   an attachment hub sized to extend through said opening of said shell.

13. The joystick adapter of claim 12, wherein:
   said joystick includes a bearing surface defined between said contact body and said attachment hub; and
   said opening of said shell defines a mating bearing surface complementary to said bearing surface of said joystick.

14. The joystick adapter of claim 1, wherein said underside of said base of said joystick defines a plurality of recesses sized to receive a corresponding depressible key therein.

15. The joystick adapter of claim 1, wherein said shell includes:
   a rim for contacting the upper surface of the controller body when said clip is retained thereon; and
   a slot defined between said rim and said opening sized to slidably receive said joystick therethrough.

16. A joystick adapter for mounting over a keypad having depressible buttons disposed on an upper surface of a controller body, the adapter comprising:
   a joystick including a knob configured for manual manipulation and a base having an underside configured to contact the depressible buttons of the keypad, said joystick being supported by the depressible buttons;
   a clip including a shell supportable on the controller body and including a concave surface facing the keypad and a rim for contacting the upper surface of the controller body, wherein said rim defines a plane substantially coinciding with the upper surface of the controller body when said clip is retained thereon, said clip further defining an opening to receive said joystick therethrough with said knob above said shell and said base between said shell and the keypad; and
   means for retaining said clip on the controller body including at least two tabs attached to said shell and projecting therefrom substantially perpendicular to said plane,
   whereby said at least two tabs extend below the upper surface of the controller body and around a corresponding side thereof to position said shell over the keypad.

17. The joystick adapter of claim 16, wherein said means for retaining includes a band having at least two attachment fingers configured for engagement to a corresponding one of said at least two tabs, said band configured to fit around a portion of the controller body to retain said clip thereon.

18. A joystick adapter kit for mounting over a keypad having depressible buttons disposed on an upper surface of a controller body, the kit comprising:
   a clip including:
      a shell supportable on the controller body, said shell defining a rim for contacting the upper surface of the controller body and an opening therethrough; and
      at least two tabs attached to said shell;
   an attachment band having at least two attachment fingers corresponding to said at least two tabs, each of said fingers defining a resilient opening for resiliently receiving a corresponding one of said tabs therethrough; and
   a joystick including;
   a base having an underside configured to contact the depressible buttons of the keypad, said base disposed between said shell and the keypad; and
   a plurality of interchangeable knobs removably engagable to said base, each of said knobs having a different external shape relative to each other configured for manual manipulation.

19. The joystick adapter kit of claim 18, wherein said plurality of knobs have external shapes selected from the group consisting of a substantially spherical shape, a substantially disc shape, an elongated shape and a shape having a recess substantially conforming to a human thumb.

20. The joystick adapter kit of claim 18, wherein said joystick includes press-fit means between said base and each of said plurality of knobs.

* * * * *